US012705341B2

(12) United States Patent
Hanus et al.

(10) Patent No.: US 12,705,341 B2
(45) Date of Patent: Aug. 11, 2026

(54) MEMBERSHIP INFERENCE ATTACKS UTILIZING AUTONOMOUS USERS

(71) Applicant: Oracle International Corporation, Redwood Shores, CA (US)

(72) Inventors: Ian Hanus, Belmont, CA (US); Animesh Agarwal, Dulles, VA (US)

(73) Assignee: Oracle International Corporation, Redwood Shores, CA (US)

( * ) Notice: Subject to any disclaimer, the term of this patent is extended or adjusted under 35 U.S.C. 154(b) by 90 days.

(21) Appl. No.: 18/825,871

(22) Filed: Sep. 5, 2024

(65) Prior Publication Data

US 2026/0064832 A1 Mar. 5, 2026

(51) Int. Cl.
*G06F 21/55* (2013.01)
*G06N 5/04* (2023.01)

(52) U.S. Cl.
CPC ............. *G06F 21/552* (2013.01); *G06N 5/04* (2013.01); *G06F 2221/034* (2013.01)

(58) Field of Classification Search
CPC .. G06F 21/552; G06F 2221/034; G06F 21/55; G06N 5/04
See application file for complete search history.

(56) References Cited

U.S. PATENT DOCUMENTS 12,395,479 B1 * 8/2025 Butler ..................... H04L 63/08
2017/0026391 A1 * 1/2017 Abu-Nimeh ........ H04L 63/1416
2022/0164643 A1 * 5/2022 Charnock ................ G06N 3/08
2022/0284106 A1 * 9/2022 Stolfo ................... H04L 67/131
2023/0142768 A1 * 5/2023 Theocharous ..... G06Q 30/0629 705/26.64
2023/0367996 A1 * 11/2023 Ajay .................... G06N 3/0499
(Continued)

OTHER PUBLICATIONS

Zhang et al., Membership Inference Attacks Against Recommender Systems. In Proceedings of the 2021 ACM SIGSAC Conference on Computer and Communications Security (CCS '21). Association for Computing Machinery, New York, NY, USA, 864-879, 2021, https://doi.org/10.1145/3460120.3484770 (Year: 2021).*
(Continued)

*Primary Examiner* — Theodore C Parsons
*Assistant Examiner* — Howard H. Louie
(74) *Attorney, Agent, or Firm* — Mughal Gaudry & Franklin PC

(57) ABSTRACT

Techniques for conducting membership inference attacks are disclosed. In an example, a plurality of target interactions of a target user with an item providing platform are monitored. A plurality of target recommendations for the target user is received from a recommendation system of the item providing platform. Using an attack classifier and based on (i) the plurality of target interactions and (ii) the plurality of target recommendations, an inference is made as to whether at least a subset of the plurality of target interactions and/or at least a subset of the plurality of target recommendations were used to train the recommendation system. The attack classifier is trained using training data associated with a plurality of autonomous users (such as autonomous sock puppets) interacting with the item providing platform. In an example, the item providing platform is one of a video providing platform, an audio providing platform, or a shopping platform.

20 Claims, 7 Drawing Sheets

(56) References Cited

U.S. PATENT DOCUMENTS

2024/0378286 A1* 11/2024 Bakshi .................. G06N 20/00

OTHER PUBLICATIONS

Chi, X. et al. "Shadow-Free Membership Inference Attacks: Recommender Systems Are More Vulnerable Than You Thought", arXiv:2405.07018v1, May 11, 2024.

Wang, Z. et al., "Debiasing learning for membership inference attacks against recommender systems", Proceedings of the 28th ACM SIGKDD Conference on Knowledge Discovery and Data Mining, 2022.

Zhang, M. et al. "Membership inference attacks against recommender systems", Proceedings of the 2021 ACM SIGSAC Conference on Computer and Communications Security, 2021.

* cited by examiner

MEMBERSHIP INFERENCE ATTACKS UTILIZING AUTONOMOUS USERS

BACKGROUND

In the burgeoning field of artificial intelligence (AI), utilization of machine learning (ML) models has become a cornerstone for developing numerous AI applications. In some AI applications, ML models can recommend items to users. A recommendation system comprises a ML model that provides suggestions or recommendations for items to a particular user, where the recommendation system infers that the recommended items are most likely to be relevant to, or liked by the particular user.

BRIEF SUMMARY

In some embodiments, a non-transitory computer-readable medium includes instructions that when executed by one or more processors, cause a system including the one or more processors to perform operations including: monitoring a plurality of target interactions of a target user with an item providing platform; receiving a plurality of target recommendations for the target user from a recommendation system of the item providing platform; and inferring, using an attack classifier and based on (i) the plurality of target interactions and (ii) the plurality of target recommendations, whether at least a subset of the plurality of target interactions and/or at least a subset of the plurality of target recommendations were used to train the recommendation system, wherein the attack classifier is trained using training data associated with a plurality of autonomous users interacting with the item providing platform. In an example, the operations further include interacting, by each of the plurality of autonomous users, with the item providing platform; and receiving, by each of the plurality of autonomous users, a corresponding plurality of recommendations from the item providing platform, based on the interaction of the corresponding autonomous user with the item providing platform.

In an example, the operations further include classifying each of the plurality of autonomous users as either a member or a nonmember, wherein a first autonomous user of the plurality of autonomous users is classified as a nonmember in response to the first autonomous user having less than a threshold number of interactions or less than a threshold time period of interactions with the item providing platform, and wherein a second autonomous user of the plurality of autonomous users is classified as a member in response to the second autonomous user having at least the threshold number of interactions or at least the threshold time period of interactions with the item providing platform. In an example, the operations further include generating, for the first autonomous user, (i) a list of nonmember items including one or more items with which the first autonomous user interacted, (ii) a plurality of nonmember interaction vectors, wherein each nonmember interaction vector of the plurality of nonmember interaction vectors includes attributes associated with a corresponding item included within the list of nonmember items, (iii) a list of nonmember recommendations including one or more recommendations received by the first autonomous user from the item providing platform, (iv) a plurality of nonmember recommendation vectors, wherein each nonmember recommendation vector of the plurality of nonmember recommendation vectors includes attributes associated with a corresponding recommendation included within the list of nonmember recommendations, (v) a center nonmember interaction vector generated based on the plurality of nonmember interaction vectors, (vi) a center nonmember recommendation vector generated based on the plurality of nonmember recommendation vectors, and (vii) a nonmember difference vector generated based on a difference between the center nonmember interaction vector and the center nonmember recommendation vector. In an example, the operations further include generating, for the second autonomous user, (i) a list of member items including one or more items with which the second autonomous user interacted, (ii) a plurality of member interaction vectors, wherein each member interaction vector of the plurality of member interaction vectors includes attributes associated with a corresponding item included within the list of member items, (iii) a list of member recommendations including one or more recommendations received by the second autonomous user from the item providing platform, (iv) a plurality of member recommendation vectors, wherein each member recommendation vector of the plurality of member recommendation vectors includes attributes associated with a corresponding recommendation included within the list of member recommendations, (v) a center member interaction vector generated based on the plurality of member interaction vectors, (vi) a center member recommendation vector generated based on the plurality of member recommendation vectors, and (vii) a member difference vector generated based on a difference between the center member interaction vector and the center member recommendation vector. In an example, the training data comprises (i) the nonmember difference vector, along with a label of nonmember associated with the nonmember difference vector, and (ii) the member difference vector, along with a label of member associated with the member difference vector. In an example, the operations further include training the attack classifier using the training data.

In an example, the attack classifier comprises a binary classifier. In an example, the operations further include accessing (i) a plurality of interactions between a plurality of users and the item providing platform, and (ii) a plurality of recommendations received by the plurality of users from the item providing platform; clustering the plurality of interactions and the plurality of recommendation into a plurality of clusters; training each of a plurality of classifiers using data from a corresponding cluster of the plurality of clusters; and operating each autonomous user of the plurality of autonomous users in conjunction with a corresponding classifier of the plurality of classifiers. In an example, operating each autonomous user comprises operating a first autonomous user of the plurality of autonomous users in conjunction with a first classifier of the plurality of classifiers, such that when the first autonomous user is to interact with an item, the first classifier dictates an action to be undertaken by the first autonomous user while interacting with the item. In an example, each of the plurality of autonomous users comprises a plurality of sock puppets. In an example, the item providing platform is one of a video providing platform, an audio providing platform, or a shopping platform.

In some embodiments, a method comprises monitoring a plurality of target interactions of a target user with an item providing platform; receiving a plurality of target recommendations for the target user from a recommendation system of the item providing platform; and inferring, using an attack classifier and based on (i) the plurality of target interactions and (ii) the plurality of target recommendations, whether at least a subset of the plurality of target interactions and/or at least a subset of the plurality of target recommendations were used to train the recommendation system, wherein the attack classifier is trained using training data associated with a plurality of autonomous users interacting with the item providing platform. In an example, the method further includes interacting, by each of the plurality of autonomous users, with the item providing platform; and receiving, by each of the plurality of autonomous users, a corresponding plurality of recommendations from the item providing platform, based on the interaction of the corresponding autonomous user with the item providing platform. In an example, the method further includes based on (i) the interaction between the plurality of autonomous users and the item providing platform and (ii) the plurality of recommendations, generating the training data; and training the attack classifier using the training data.

In an example, the attack classifier comprises a binary classifier. In an example, the method further includes accessing (i) a plurality of interactions between a plurality of users and the item providing platform, and (ii) a plurality of recommendations received by the plurality of users from the item providing platform; clustering the plurality of interactions and the plurality of recommendation into a plurality of clusters; training each of a plurality of classifiers using data from a corresponding cluster of the plurality of clusters; and operating each autonomous user of the plurality of autonomous users in conjunction with a corresponding classifier of the plurality of classifiers. In an example, operating each autonomous user comprises operating a first autonomous user of the plurality of autonomous users in conjunction with a first classifier of the plurality of classifiers, such that when the first autonomous user is to interact with an item, the first classifier dictates an action to be undertaken by the first autonomous user while interacting with the item.

In some embodiments, a system comprises one or more processors; and one or more non-transitory computer-readable media storing instructions, which, when executed by the system, cause the system to perform a set of actions including monitoring a plurality of target interactions of a target user with an item providing platform; receiving a plurality of target recommendations for the target user from a recommendation system of the item providing platform; and inferring, using an attack classifier and based on (i) the plurality of target interactions and (ii) the plurality of target recommendations, whether at least a subset of the plurality of target interactions and/or at least a subset of the plurality of target recommendations were used to train the recommendation system, wherein the attack classifier is trained using training data associated with a plurality of autonomous users interacting with the item providing platform. In an example, the item providing platform is one of a video providing platform, an audio providing platform, or a shopping platform.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
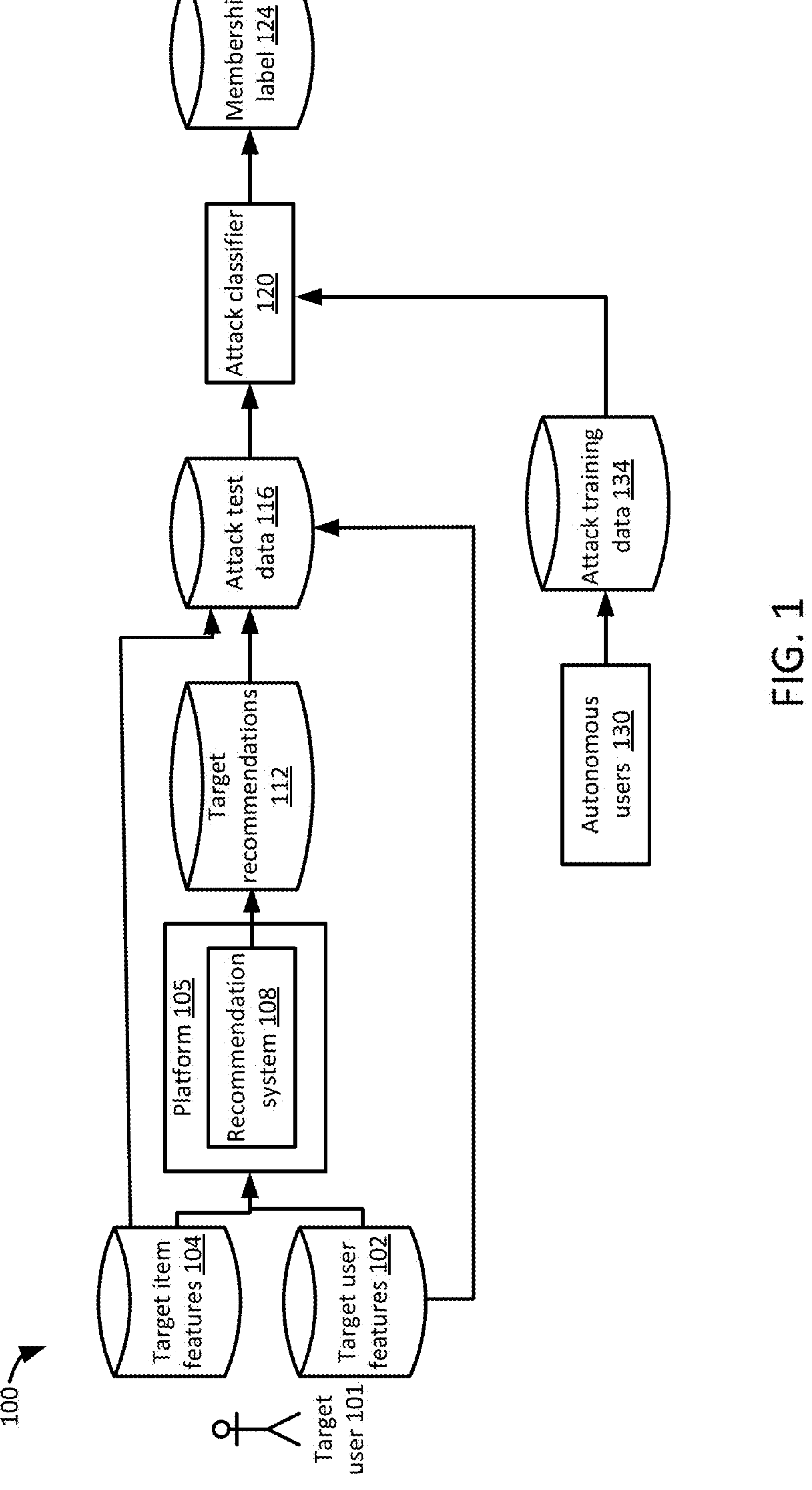
FIG. 1 illustrates a system including an attack classifier configured to perform membership inference attacks (MIA) on a recommendation system within an item providing platform, and a setup to train the attack classifier.

As described above, a recommendation system comprises an ML model that provides suggestions or recommendations for items to users. Based on past interactions with a specific user, the recommendation system recommends new items to the user for consumption. For example, a platform may offer thousands of items for consumption by users. The recommendation system may be used when a user has to choose one or more items from a potentially overwhelming number of items that the platform may offer.

The recommendation system may be used in conjunction with an appropriate type of platform. The platform may be a cloud-based platform that provides items (such as videos, audios, messages, shopping items, etc.) for consumption (such as view, listen to, shop, or otherwise interact with) to a plurality of users. Merely as an example, the platform may be a video providing platform that provides videos for viewing by users, an audio providing platform that provides audios for listening by users, a shopping platform that provides physical or virtual items for buying by users, and/or the like. Because of the large number of items provided by the platform, a user may be overwhelmed in selecting items for consumption.

The recommendation system provides recommendations or suggestions for items that are most pertinent to a particular user. The recommendation system is a ML model that is trained to receive information about the user and/or past interactions of the user with the platform, and provide item recommendations to the user.

In an example, the recommendation system may use information about interactions with a user, information about the user, and/or whether the user likes or dislikes the recommendations, e.g., in order to further train the recommendation system. However, training the recommendation system using data of a user, without explicit permission from the user, may be undesirable from the perspective of the user and/or from user data privacy perspective.

Accordingly, described herein is a setup to infer whether information of one or more target users are being used (or has been used) to train the recommendation system. This is also referred to as "membership inference attack (MIA)," in which given (i) a target user's interaction with the platform and (ii) recommendations received by the user from the platform, an attack classifier tries to infer whether information associated with the target user (such as the interactions and the recommendations) are used to train the recommendation system. Thus, the attack classifier aims to infer whether the information associated with the target user was a part of the training dataset of the recommendation system. The attack classifier is a binary classifier that determines whether data of a given target user was used in training the target recommendation system.

Training the attack classifier itself is a nontrivial task. In some examples, to train the attack classifier, a shadow model is formed, which may have data distribution and model architecture similar to that of the target recommendation system. This shadow model generates features that serve as input for training the attack classifier. However, constructing a reliable shadow model in the real world is challenging, e.g., due to the unknown nature of the model architecture and data distribution of the recommendation system. Furthermore, interaction data between a large set of real or human users and a platform, and corresponding recommendation data may not be readily available, and hence, it may not be possible to train the attack classifier using data from a large set of real users.

Described herein are use of autonomous users, also known as sock puppets or bots, who interact with the platform to simulate behavior of real users. These autonomous users interact with the platform, to generate interaction data of these autonomous users. Resultant recommendations are received from the recommendation system of the platform. In an example, the interaction data and the resultant recommendations are used to generate attack training data, which are in turn used to train the above-described attack classifier. For example, monitoring interactions and recommendations of the autonomous users over a significant period allows to develop a robust dataset for training the attack classifier. The trained attack classifier can then be used for membership inference attacks.

In an example, for each target user (for whom the membership inference attack is to be performed), the attack classifier outputs a membership label having two possible states: (i) a "member" state that implies that data of the target user was inferred by the attack classifier to be used to train the recommendation system, or (ii) a "non-member" state that implies that data of the target user was inferred by the attack classifier to be not used to train the recommendation system. In an example, the attack classifier may be a multiplayer perceptron classifier, or another type of a ML model, such as a binary classification model, e.g., a logistic regression model.

In an example, each autonomous user works in conjunction with a like/dislike classifier. Each like/dislike classifier is trained (e.g., using techniques described below), and the trained like/dislike classifier dictates a behavior of the corresponding autonomous user (e.g., whether the autonomous user will like or dislike an item of the platform, and a manner in which the autonomous user will interact with the item).

To train a plurality of like/dislike classifiers corresponding to the plurality of autonomous users, initially a relatively small number of users (such as tens, or hundreds of users) interact with the platform. These users are real human users interacting with the platform, such as consuming items from the platform, liking or disliking items within the platform, selectively sharing information associated with zero, one, or more number of items with friends, and/or the like. The behavior of these users is representative of behavior of general or real users of the platform. Such interactions of the users are monitored by a clustering service.

Since the clustering service has access to the relatively small set of user interactions and corresponding recommendations, such information is used to generate realistically behaved autonomous users. For example, the like/dislike classifiers are trained (e.g., using techniques described below) using the small set of user interactions and corresponding recommendations. In an example, a clustering algorithm (such as a K-means clustering algorithm or another type of clustering algorithm) is utilized to split or divide the small set of user interactions into N number of cohesive groups (e.g., the groups are sorted by cohesion), thereby forming N number of clusters of training data that are used to train M number of like/dislike classifiers (where $M<N$), as described below in further details.

In an example, the like/dislike classifiers and the corresponding autonomous users may be deployed using browser automation or another software automation process. The automation process interacts with the platform, e.g., to generate platform interaction data and receive platform recommendations. Thus, each of the autonomous users interacts with the platform intermittently, periodically, or nonperiodically, to thereby generate platform interaction data and resultantly receive platform recommendations.

In an example, a training data generation service generates or otherwise accesses an item representation, and stores the item representation in a storage repository that is accessible to the autonomous users. The item representation is representative of a plurality of items available within the platform for consumption. For example, the item representation is a vector representation of at least some or all the items available for consumption within the platform. The item representation, in an example, is created from the item metadata available from the platform. In another example, the item representation is created employing matrix factorization, e.g., from a sufficient number of user-item interactions (e.g., interactions between users and items available within the platform), as will be described below in further detail.

When an autonomous user initially interacts with the platform, the platform may not have sufficient information about the likes and dislikes of the autonomous user, and at this stage, the platform may provide recommendations relatively blindly, e.g., without taking into account or being aware of the likes and dislikes of the autonomous user. But as and when the autonomous user continues interacting with the platform, the platform may have more data on the likes and dislikes of the autonomous user, based on which the platform can provide informed or better recommendations to the autonomous user. Accordingly, interactions of each autonomous user with the platform are classified into two categories: (i) interactions with users that are relatively new to the platform, and (ii) interactions with users that have been with the platform for a relatively long time period or has a relatively greater number of interactions with the platform, as described below in further detail. For example, users that are relatively new are given a "nonmember" label, where such a nonmember autonomous user has not yet performed sufficient interactions with the platform, such as less than a threshold number of interactions or less than a threshold time period of interactions. On the other hand, users that have been in the platform for sufficiently long are given a "member" label, where a member autonomous user has sufficient interactions with the platform, such as more than the threshold number of interactions or more than the threshold time period of interactions. Accordingly, in an example, each of the autonomous users is assigned a member or a nonmember label by the training data generation service.

Once the training data generation service generates sufficient data on interactions between the autonomous users and the platform and the resultant recommendations, the training data generation service generates labelled attack training data for training the attack classifier. Techniques for generating labelled attack training data, based on interactions between the autonomous users and the platform and the resultant recommendations, have been described below in details, e.g., with respect to equations 1-13.

The attack training data is used to train the attack classifier, which is a binary classifier that infers whether data associated with a given target user is used to train the recommendation system (e.g., whether the target user has a membership label of member or nonmember). Inference is then run on the test points on which attempt is made to gain membership information. For example, given a target user and his or her interactions with the platform, the recommendation system provides a plurality of recommendations to the target user. Based on such recommendations and the interactions, a feature vector for the target user is generated, e.g., as described below with respect to equations 1-13. The feature vector is then used as an input for the attack classifier, which carries out the inference, to determine a user's membership label.

FIG. 1 illustrates a system 100 including an attack classifier 120 configured to perform membership inference attacks (MIA) on a recommendation system 108 within an item providing platform 105, and a setup to train the attack classifier 120. As described above, in a membership inference attack, the attack classifier 120 aims to infer whether one or more target users' data is being used (or has been used) to train the recommendation system 108.

The platform 105 is a cloud-based platform that provides items (such as videos, audios, messages, shopping items, etc.) for consumption (such as view, listen to, shop, or otherwise interact with) to a plurality of users. Merely as an example, the platform 105 may be a video providing platform that provides videos for viewing by users, an audio providing platform that provides audios for listening by users, a shopping platform that provides physical or virtual items for buying by users, and/or the like. The platform 105 may store thousands, or tens of thousands or higher number of items, which are available for a user to view, listen to, shop, or otherwise consume. Because of the large number of items provided by the platform 105, a user may be overwhelmed in selecting items for consumption.

The recommendation system 108 is a machine learning model, which is a type of an information filtering system. The recommendation system 108 provides recommendations or suggestions for items that are most pertinent to a particular user. For example, the recommendation system 108 may be used to provide recommendations for a user, when the user has to select one or more items from a large number of candidate items that the platform 105 may offer. In an example, the recommendation system 108 gathers information about the user and/or past interactions of the user with the platform 105. Information about the user includes, for example, a location of the user, an Internet Protocol (IP) address of the user (e.g., based on which the location of the user may be tracked), a language preference of the user, age and sex of the user, and/or one or more other demographical information about the user. Interactions of the user with the platform 105 may include, for example, a list of past items (such as videos) consumed by the user, a duration of time the user has consumed individual items, whether the user has liked, disliked, bought, clicked, and/or commented on an item, whether the user has shared an item information with a friend, if the user has repeatedly consumed the entire or at least a section of the item, and/or the like.

The recommendation system 108 is a machine learning (ML) model that is trained to receive such information about the user and/or past interactions of the user with the video platform, and provide item recommendations to the user. The recommendations may be in the form of suggested items (such as videos) for consumption by the user. The recommended items are items that the recommendation system 108 infers would be most relevant to the user.

In an example, the recommendation system 108 may use the interactions with a user, information about the user, and/or whether the user likes the recommendations, e.g., in order to further train the recommendation system 108. However, training the recommendation system 108 using data of a user may be undesirable from the perspective of the user and/or from user data privacy perspective. Accordingly, the attack classifier 120 aims to infer whether information of an example target user 101 is being used (or has been used) to train the recommendation system 108.

For example, FIG. 1 illustrates target user features 102, which may include pertinent information about the user, such as user demographics data described above. FIG. 1 further illustrates target item features 104, which may include past interactions of the target user 101 with one or more items provided by the platform 105. Examples of past interactions with the platform 105 have been described above.

The recommendation system 108 receives and/or has access to the target user features 102 and target item features 104. Based on the target user features 102 and target item features 104, the recommendation system 108 provides target recommendations 112, which may be in the form of suggestions or recommendations of items for consumption by the target user 101.

The attack classifier 120 receives attack test data 116, which includes one or more of (such as all of) (i) the target user features 102, (ii) the target item features 104, and (iii) the target recommendations 112. Based on the attack test data 116, the attack classifier 120 aims to infer whether data associated with the user 101 were used to train the recommendation system 108.

In an example, the attack classifier 120 may output a membership label 124 having two possible states: (i) "member" implies that data of the target user 101 was inferred to be used to train the recommendation system 108, or (ii) "non-member" implies that data of the target user 101 was inferred to be not used to train the recommendation system 108. Instead of the member and non-member labels, the membership label 124 may include other labels, such as a 1 or 0.

In an example, the attack classifier 120 may be a multiplayer perceptron classifier, or another type of a ML model, such as a binary classification model, e.g., a logistic regression model. In an example, the attack classifier 120 may rely on one or more binary classification metrics, such as AUC (area under receiver operating characteristic curve) classification metric, Recall classification metric, Precision classification metric, and F1 score based classification metric, or another type of classification metric, to generate the membership label 124 for the target user 101.

In an example, the attack classifier 120 is trained using attack training data 134. For example, the attack classifier 120 may initially be trained using the attack training data 134, and subsequently the trained attack classifier 120 may be used to generate the membership labels 124 for various target users, including the target user 101 illustrated in FIG. 1.

In an example, the attack training data 134, or at least a subset of the attack training data 134, may be generated by a plurality of autonomous users 130. For example, an autonomous user 130 may be a bot or a sock puppet, such as a software application that can perform automated tasks, and may imitate or simulate behavior of a real user of the platform 105.

The autonomous users 130 (which may be bots or sock puppets) have access to the platform 105. For example, an autonomous users 130 interacts with the platform 105, providing item features and/or user features to the platform 105. The autonomous users 130 in turn receive recommendations from the recommendation system 108. In an example, the attack training data 134 comprises the interactions of individual autonomous user 130 with the platform 105 and the corresponding recommendations received from the platform 105, as described below.

Once trained, the attack classifier 120 gathers the attack test data 116, which includes interactions of a target user 101 with the platform 105, and recommendations 112 received from the recommendation system 108. The goal of the system 100, including the attack classifier 120, is to determine whether the attack test data 116 of the target user 101 is used to train the recommendation system 108.

Figure 2:
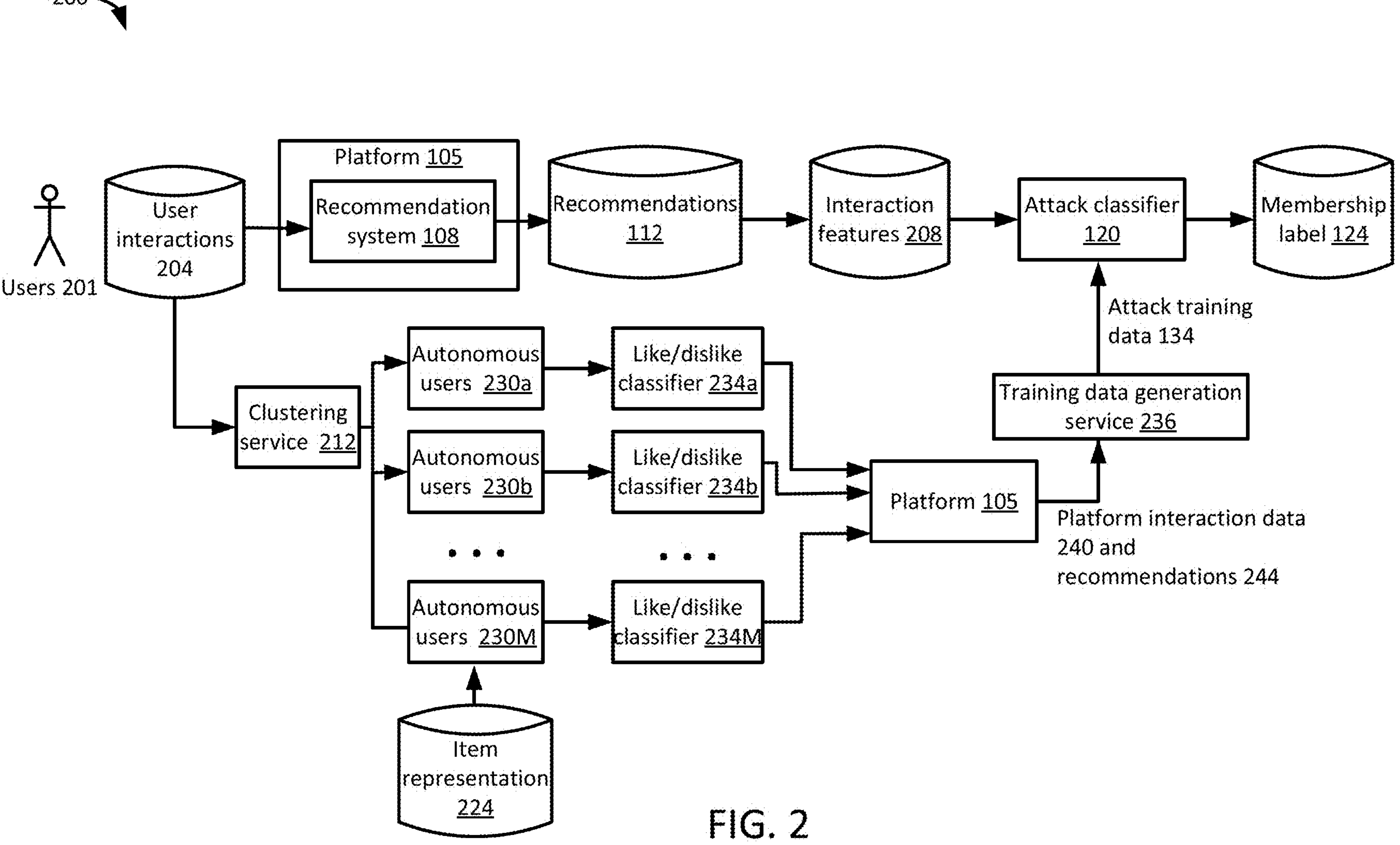
FIG. 2 illustrates a system for generating attack training data for training an attack classifier.

FIG. 2 illustrates a system 200 for generating attack training data for training an attack classifier (such as the attack classifier 120 of FIG. 1). In FIG. 2, a plurality of users 201 interacts with the platform 105, to generate user interactions 204, which are then used to configure and operate a plurality of autonomous users 230*a*, . . . , 230M.

In an example, initially, a training data generation service 236 of the system 200 generates or otherwise accesses an item representation 224, and stores in a storage repository that is accessible to the autonomous users 230. The item representation 224 is representative of a plurality of items available within the platform 105 for consumption. For example, the item representation 224 is a vector representation of at least some or all the items available for consumption within the platform 105. The item representation 224, in an example, is created from the item metadata available from the platform 105. In another example, the item representation 224 is created employing matrix factorization, e.g., from a sufficient number of user-item interactions (e.g., interactions between users and items available within the platform 105). In an example, the matrix factorization involves decomposing a user-item interaction matrix, where each element of the user-item interaction matrix represents a relationship between a user and an item. For example, a 1×1 element of the user-item interaction matrix is representative of an interaction of a first user with a first item, such as a rating or liking (or disliking) provided by the first user for the first item. The matrix factorization involves decomposing the user-item interaction matrix into a product of two lower-dimensional matrices, one of which is the item representation 224. In an example, the item representation 224 is provided to the autonomous users 230*a*, . . . , 230M.

In an example, the autonomous users 230*a*, . . . , 230M are used to generate attack training data 134 for training the attack classifier 120. For example, the training data generation service 236 of the system 200 stores information associated with interactions between the platform 105 and autonomous users 230*a*, . . . , 230M, where such interactions are referred to as platform interaction data 240 in FIG. 2. The training data generation service 236 also has access to recommendations received by the autonomous users 230*a*, . . . , 230M from the recommendation system 108, where the recommendations are stored as recommendations 244. Based on the platform interaction data 240 and the recommendations 244, the training data generation service 236 generates the attack training data 134 for training the attack classifier 120.

For example, as illustrated in FIG. 2, a relatively small number of users 201 (such as tens, or hundreds of users) interact with the platform 105. The users 201 are real human users interacting with the platform 105, such as consuming items from the platform 105, liking or disliking items within the platform 105, selectively sharing information associated with zero, one, or more number of items with friends, and/or the like. The behavior of the users 201 is representative of behavior of general or real users of the platform 105. Such interactions of the users 201 are monitored by a clustering service 212 of the system 200.

Since the clustering service 212 has access to the relatively small set of user interactions 204, the user interactions 204 are used to generate realistically behaved autonomous users 230*a*, . . . , 230M. Each autonomous user 230 is associated with a like/dislike classifier 234 (e.g., autonomous user 230*a* is associated with a like/dislike classifier 234*a*). The like/dislike classifier 234 is trained (e.g., using techniques described below), and the trained like/dislike classifier 234 dictates a behavior of the corresponding autonomous user 230 (e.g., whether the autonomous user will like or dislike an item of the platform 105).

For example, the like/dislike classifier 234 may assign to individual items within the item representation a 0 or 1 score (where 0 may imply a like and 1 may imply a dislike, or vice versa), or may assign a score between 0 and 10 (e.g., where 0 being totally dislike and 1 being absolutely like). Thus, an autonomous user 230 and a corresponding like/dislike classifier 234 work in conjunction, and mimic or simulate behavior of a real user of the platform 105.

In an example, a clustering algorithm (such as a K-means clustering algorithm or another type of clustering algorithm) is utilized to split or divide the user interactions 204 into N number of cohesive groups (e.g., the groups are sorted by cohesion), thereby forming N number of clusters of training data that are used to train the M number of like/dislike classifiers 234*a*, . . . , 234M, where M<N. The objective of a like/dislike classifier 234 is to predict or dictate whether the corresponding autonomous user 230 would like or dislike an item, as described above. Individual like/dislike classifier 234 allows decision making for a corresponding user actions (e.g., as simulated by the corresponding autonomous user 230) on the platform 105 (e.g., liking an item, commenting on an item, sharing a link of the item with friends, buying an item, etc.). In an example, a like/dislike classifier 234 may also dictate a frequency with which the corresponding autonomous user 230 should interact with the platform 105.

In an example, the like/dislike classifiers 234*a*, . . . , 234M and the corresponding autonomous users 230*a*, . . . , 230M may be deployed using browser automation or another software automation process. The automation process interacts with the platform 105, e.g., to generate platform interaction data 240 and receive platform recommendations 244. Thus, each of the autonomous users 230*a*, . . . , 230M interacts with the platform 105 intermittently, periodically, or nonperiodically, to thereby generate the platform interaction data 240 and receive the platform recommendations 244.

When an autonomous user 230 initially interacts with the platform 105, the platform 105 may not have sufficient information about the likes and dislikes of the autonomous user 230, and at this stage, the platform 105 may provide recommendations relatively blindly, e.g., without taking into account or being aware of the likes and dislikes of the autonomous user 230. But as and when the autonomous user 230 continues interacting with the platform 105, the platform 105 may have more data on the likes and dislikes of the autonomous user 230, based on which the platform 105 can provide informed or better recommendations to the autonomous user 230.

Accordingly, interactions of each autonomous user 230 with the platform are classified into two categories: (i) interactions with users that are relatively new to the platform 105, and (ii) interactions with users that have been with the platform 105 for a relatively long time period or has a relatively greater number of interactions with the platform 105. For example, users that are relatively new are given a "nonmember" label, where such a nonmember autonomous user has not yet performed sufficient interactions with the platform 105, such as less than a threshold number of interactions or less than a threshold time period of interactions.

On the other hand, users that have been in the platform 105 for sufficiently long are given a "member" label, where a member autonomous user 230 has sufficient interactions with the platform 105, such as more than the threshold number of interactions or more than the threshold time period of interactions. Accordingly, in an example, each of the autonomous users 230*a*, . . . , 230M is assigned a member or nonmember label by the training data generation service 236.

Figure 3:
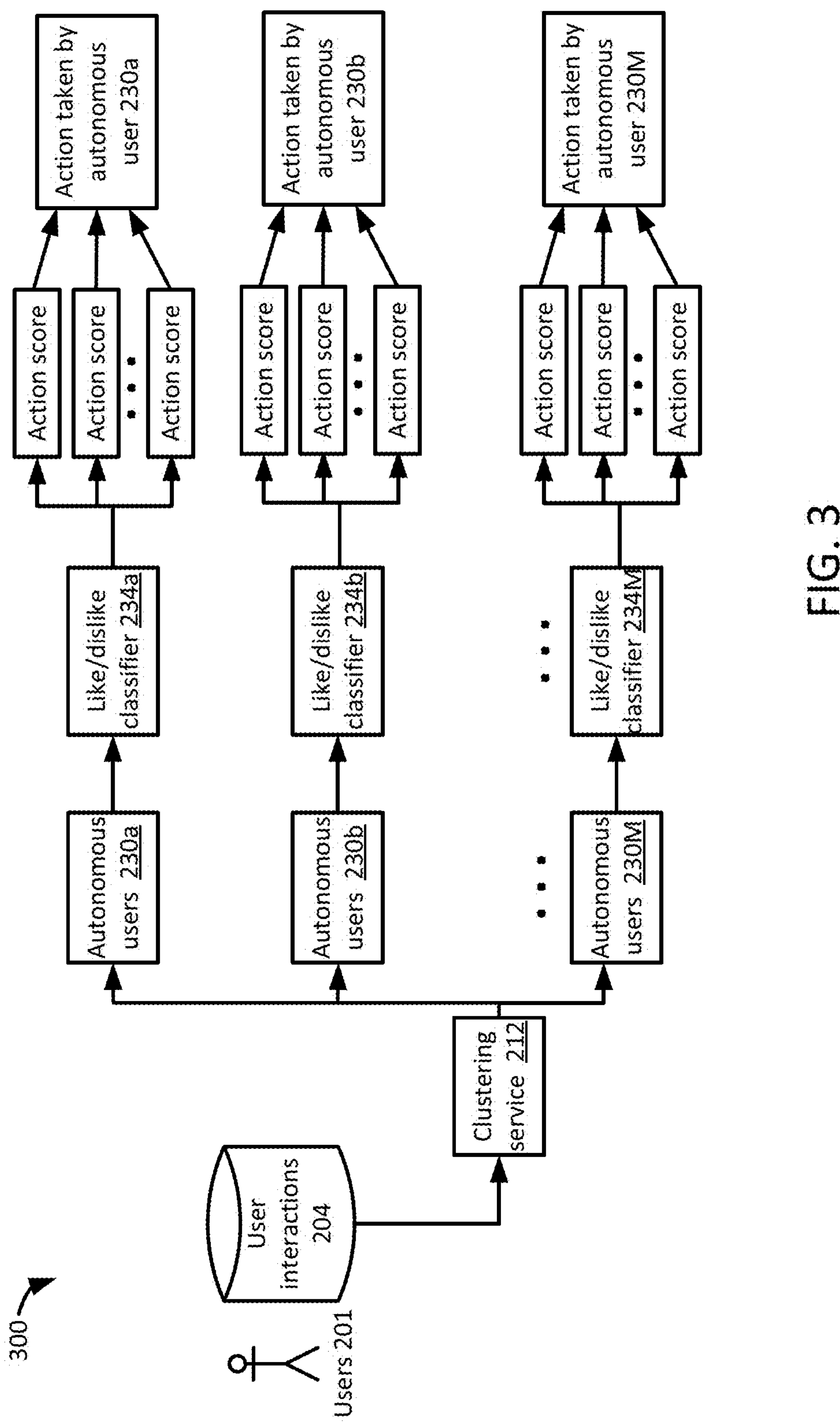
FIG. 3 illustrates a system depicting an operation of a plurality of autonomous users and a corresponding plurality of like/dislike classifiers.

FIG. 3 illustrates a system 300 depicting an operation of a plurality of autonomous users 230 and a corresponding plurality of like/dislike classifiers 234. Operations of an example autonomous user 230*a* and a corresponding like/dislike classifier 234*a* are described below, and operations of other autonomous users 230*b*, . . . , 230M and other corresponding like/dislike classifiers 234 will be evident from such description.

Each time the autonomous user 230*a* encounters an item, the autonomous user 230*a* can undertake one of many possible actions for the item, such as interact with the item in one of many possible manners. For example, the autonomous user 230*a* may consume (e.g., view, buy, listen to) the item, repeatedly consume the item, like the item, dislike the item, ignore the item, delete the item from a recommendation list, share information associated the item with a friend, etc.

The like/dislike classifier 234*a* assigns a score (labelled as "action score" in FIG. 3) to each of these actions, based on the training provided to the like/dislike classifier 234*a* using the user interactions 204. For example, in one situation, the like/dislike classifier 234*a* may assign a high score for consuming the item and low score for ignoring the item. Based on the relative scores associated with the many possible actions, the autonomous user 230*a* undertakes the action having the highest score (labeled as "Action taken by autonomous user 230*a*" in FIG. 3).

Referring again to FIG. 2, interactions of an $i^{th}$ nonmember autonomous user 230 with the platform 105 can be transformed into vectors as follows:

$$I_{(i)}^{out} \rightarrow U_{(i)}^{out}. \quad \text{Equation 1}$$

In equation 1, subscript i is an index of the $i^{th}$ nonmember autonomous user 230, $$I_{(i)}^{out}$$

is a list of items (such as a vector) that a nonmember autonomous user has interacted with, where a nonmember autonomous user is an autonomous user that has less than a threshold number (or threshold time period) of interactions with the platform 105, as described above.

$$I_{(i)}^{out}$$

is also referred to as a list of nonmember items, and lists items of the platform 105 that the nonmember autonomous user has interacted with.

$$U_{(i)}^{out}$$

is the list of vectors, where each interacted item in the list of nonmember items $$I_{(i)}^{out}$$

is mapped to an item vector corresponding to the nonmember autonomous user. Merely as an example, assume a scenario where the $i^{th}$ nonmember autonomous user 230 (such as the autonomous user 230*a*) has interacted with two items, such as item 1 and item 2 (although in a practical scenario, the autonomous user is likely to interact with a much larger number of items). In such a scenario, $$I_{(i)}^{out}$$

for this new autonomous user 230*a* will be a 2×1 vector identifying items 1 and 2.

$$U_{(i)}^{out}$$

will be a P×2 matrix (or a combination of two vectors), where column 1 of the P×2 matrix will lists P number of attributes associated with item 1 (e.g., for how long has the nonmember autonomous user 230*a* viewed item 1, a rating given by the nonmember autonomous user 230*a* for item 1, whether the nonmember autonomous user 230*a* has shared or liked item 1, etc.). Column 2 of the P×2 matrix will similarly lists attributes associated with item 2. The list of vectors $$U_{(i)}^{out}$$

is also referred to herein as a list of interaction vectors for the $i^{th}$ nonmember autonomous user, and also referred to as a plurality of nonmember interaction vectors, where each interaction vector in the nonmember interaction vectors includes attributes associated with a corresponding item with which the $i^{th}$ nonmember autonomous user interacted.

Interactions of an $i^{th}$ member autonomous users 230 with the platform 105 can be transformed into vectors as follows:

$$I_{(i)}^{in} \rightarrow U_{(i)}^{in}. \qquad \text{Equation 2}$$

In equation 2, subscript i is an index of an $i^{th}$ member autonomous user 230, $$I_{(i)}^{in}$$

is a list of items (such as a vector) that a member autonomous user has interacted with, where the member autonomous user is an autonomous user that has more than a threshold number (or threshold time period) of interactions with the platform 105, as described above.

$$I_{(i)}^{in}$$

is also referred to as a list of member items, and lists items of the platform 105 that the member autonomous user has interacted with.

$$U_{(i)}^{in}$$

is the list of vectors, where each interacted item in $$I_{(i)}^{in}$$

is mapped to an item vector corresponding to the $i^{th}$ member autonomous user. The list of vectors $$U_{(i)}^{in}$$

is also referred to herein as a list of interaction vectors for the $i^{th}$ member autonomous user, and also referred to as a plurality of member interaction vectors. Equation 2 will be evident, based on the above description with respect to equation 1.

Recommendations received by an $i^{th}$ nonmember autonomous user 230 from the platform 105 can be transformed into vectors as follows:

$$R_{(i)}^{out} \rightarrow V_{(i)}^{out}. \qquad \text{Equation 3}$$

In equation 3, subscript i is an index of the $i^{th}$ nonmember autonomous user 230, $$R_{(i)}^{out}$$

is a list of recommended items (such as a vector) that the nonmember autonomous user receives from the platform 105.

$$R_{(i)}^{out}$$

is also referred to as a list of nonmember recommendations.

$$V_{(i)}^{out}$$

is the list of vectors, where each recommended item in the recommended list of items $$R_{(i)}^{out}$$

is mapped to an item vector corresponding to a new autonomous user. Merely as an example, assume a scenario where the nonmember autonomous user 230 (such as the autonomous user 230$a$) has received three recommended items, such as items A, B, and C (although in a practical scenario, the autonomous user is likely to receive a much larger number of recommended items from the platform 105). In such a scenario, $$R_{(i)}^{out}$$

for this nonmember autonomous user 230$a$ will be a 3×1 vector identifying items A, B, and C.

$$V_{(i)}^{out}$$

will be a Q×3 matrix (or a combination of three vectors), where column 1 of the Q×3 matrix will lists Q number of attributes associated with the recommended item A (e.g., a genre of the recommended item A, a duration of the recommended item A, whether recommended item A is a US-based or a foreign TV show, etc.). Similarly, column 2 of the Q×3 matrix will similarly lists Q number of attributes associated with recommended item B, and column 3 of the Q×3 matrix will similarly lists Q number of attributes associated with recommended item C. The list of vectors $$R_{(i)}^{out}$$

is also referred to herein as a list of recommendation vectors for the $i^{th}$ nonmember autonomous user, and also referred to as a plurality of nonmember recommendation vectors.

Recommendations received by an $i^{th}$ member autonomous user 230 from the platform 105 can be transformed into vectors as follows:

$$R_{(i)}^{in} \rightarrow V_{(i)}^{in}. \qquad \text{Equation 4}$$

In equation 4, subscript i is an index of the $i^{th}$ member autonomous user 230, $$R_{(i)}^{in}$$

is a list of recommended items (such as a vector) that the member autonomous user receives from the platform 105.

$$R_{(i)}^{in}$$

is also referred to as a list of member recommendations.

$$V_{(i)}^{in}$$

is the list of vectors, where each recommended item in the recommended list of items $$R_{(i)}^{in}$$

is mapped to an item vector corresponding to the member autonomous user. The list of vectors $$R_{(i)}^{in}$$

is also referred to herein as a list of recommendation vectors for the $i^{th}$ member autonomous user, and also referred to as a plurality of member recommendation vectors. Equation 4 will be evident, based on the above description with respect to equation 3.

Thus, $$U_{(i)}^{out} \text{ and } U_{(i)}^{in}$$

comprises corresponding lists of interaction vectors identifying interactors of nonmember and member autonomous users, respectively, with the platform 105. Similarly, $$V_{(i)}^{out} \text{ and } V_{(i)}^{in}$$

comprises corresponding lists of recommendation vectors identifying recommendations received by nonmember and member autonomous users, respectively, from the platform 105.

A feature vector for a given autonomous user is generated using the vector representations of the interactions and recommendations for the autonomous user. A center vector $$\overrightarrow{U}_{(i)}^{out}$$

of the list of interaction vectors for an $i^{th}$ nonmember autonomous user can be calculated as follows (where $$\overrightarrow{U}_{(i)}^{out}$$

is referred to as a center nonmember interaction vector):

$$\overrightarrow{U}_{(i)}^{out} = \sum_j \frac{\overrightarrow{U}_{(ij)}^{out}}{N_{(i)}^{int}}. \qquad \text{Equation 5}$$

In equation 5, subscript i is an index of the $i^{th}$ nonmember autonomous user 230, subscript j is an index of a $j^{th}$ interaction between the $i^{th}$ nonmember autonomous user 230 and the platform 105.

$$N_{(i)}^{int}$$

is the total number or interactions between the $i^{th}$ nonmember autonomous user 230 and the platform 105 (e.g., index j varies between 1 and $N_{(i)}^{int}$).

Thus, $$\vec{U}_{(ij)}^{out}$$

is the j$^{th}$ interaction between the i$^{th}$ nonmember autonomous user and the platform 105. The center vector $$\vec{U}_{(i)}^{out}$$

is also referred to herein as a center nonmember interaction vector for the i$^{th}$ nonmember autonomous user.

Similarly, a center vector $$\vec{U}_{(i)}^{in}$$

of the list of interaction vectors for an i$^{th}$ member autonomous user can be calculated as follows:

$$\vec{U}_{(i)}^{out} = \sum_j \frac{\vec{U}_{(ij)}^{in}}{N_{(i)}^{int}}. \quad \text{Equation 6}$$

The center vector $$\vec{U}_{(i)}^{in}$$

is also referred to herein as a center member interaction vector for the i$^{th}$ member autonomous user. Equation 6 will be evident, based on the above description with respect to equation 5.

A center vector $$\vec{V}_{(i)}^{out}$$

of the list of recommendation vectors for an i$^{th}$ nonmember autonomous user can be calculated as follows:

$$\vec{V}_{(i)}^{out} = \sum_j w_{(ij)} \cdot \frac{\vec{V}_{(ij)}^{out}}{N_i^{rec}}. \quad \text{Equation 7}$$

In equation 7, subscript i is an index of the i$^{th}$ nonmember autonomous user 230, and subscript j is an index of the j$^{th}$ recommendation provided by the platform 105 to the i$^{th}$ nonmember autonomous user 230. Thus, $$\vec{V}_{(ij)}^{out}$$

is the j$^{th}$ recommendation provided to the i$^{th}$ nonmember autonomous user.

$$N_i^{rec}$$

is the total number of recommendations provided to the i$^{th}$ nonmember autonomous user. The center vector $$\vec{V}_{(i)}^{out}$$

is also referred to herein as a center nonmember recommendation vector for the i$^{th}$ nonmember autonomous user.

In an example, not all recommendations provided by the platform 105 to a user have equal weightage. For example, the platform 105 may provide relatively more relevant recommendation items at a top of a list of recommended items, and may provide relatively less relevant recommendation items at a bottom of a list of recommended items. Accordingly, a weight $w_{(ij)}$ is assigned that captures a relative weight of a j$^{th}$ recommended item relative to other recommended items. For example, if the recommendations are provided in an ordered sequence, the recommendations at the top are more likely to be liked by the user than the recommendations at the bottom. Merely as an example, if a total k recommendations are provided to a user i, then the weight $w_{(ij)}$ can be calculated as follows:

$$w_{(ij)} = \frac{k - j + 1}{\sum_{n=1}^{k} n}. \quad \text{Equation 8}$$

In equation 8, again, subscript i is an index of the i$^{th}$ nonmember autonomous user 230, subscript j is an index of j$^{th}$ recommendation provided by the platform 105 to the i$^{th}$ new autonomous user 230. Thus, when j is relatively low (e.g., recommendations at the top of the list), the corresponding weight is relatively high; and when j is relatively high (e.g., recommendations at the bottom of the list), the corresponding weight is relatively low.

If the recommendations are not ordered in a sequence (e.g., each recommendation has equal weight), then, for example:

$$w_{(ij)} = \frac{1}{k}. \quad \text{Equation 9}$$

Similar to equation 7, a center vector $$\vec{V}_{(i)}^{in}$$

of the list of recommendation vectors for an i$^{th}$ member autonomous user can be calculated as follows:

$$\vec{V}_{(i)}^{in} = \sum_j w_{(ij)} \cdot \frac{\vec{V}_{(ij)}^{in}}{N_i^{rec}}. \quad \text{Equation 10}$$

The center vector $$\vec{V}^{in}_{(i)}$$

is also referred to herein as a center member recommendation vector for the $i^{th}$ member autonomous user. Equation 10 will be evident, based on the above description with respect to equations 7-9.

Subsequently, the training data generation service 236 generates a difference between the center interaction vector $$\vec{V}^{out}_{(i)}$$

for the $i^{th}$ nonmember autonomous user and the center recommendation vector $$\vec{V}^{out}_{(i)}$$

for the $i^{th}$ nonmember autonomous user as follows:

$$\vec{Z}^{out}_{(i)} = \vec{U}^{out}_{(i)} - \vec{V}^{out}_{(i)}. \quad \text{Equation 11}$$

$$\vec{Z}^{out}_{(i)}$$

of equation 11 is referred to as a nonmember difference vector for the $i^{th}$ nonmember autonomous user.

Similarly, the training data generation service 236 generates a difference between the center interaction vector $$\vec{U}^{in}_{(i)}$$

for the $i^{th}$ member autonomous user and the center recommendation vector $$\vec{V}^{in}_{(i)}$$

for the $i^{th}$ member autonomous user as follows:

$$\vec{Z}^{in}_{(i)} = \vec{U}^{in}_{(i)} - \vec{V}^{in}_{(i)}. \quad \text{Equation 12}$$

$$\vec{Z}^{in}_{(i)}$$

of equation 12 is referred to as a member difference vector for the $i^{th}$ member autonomous user.

In an example, one or more of the above lists and vectors, as described with respect to equations 1-12, may be calculated or generated (or accessed) by the training data generation service 236 of the system 200 of FIG. 2.

Also, each autonomous user is assigned a label $y_{(i)}$ of 1 or 0, indicating whether the autonomous user is a nonmember or a nonmember (merely as an example, 0 implies a nonmember and 1 implies a member). The attack training data 134 for the attack classifier 120 generated by the training data generation service 236 is as follows:

$$X_{(i)} = \vec{Z}^{out}_{(i)}, \text{ if } y_{(i)} = 0 \qquad \text{Equation 13}$$

$$X_{(i)} = \vec{Z}^{in}_{(i)}, \text{ if } y_{(i)} = 1.$$

Thus, the attack training data 134 is used to train the attack classifier 120, which is a binary classifier that infers whether data associated with a given target user (such as the user 101) is used to train the recommendation system 108 (e.g., whether the target user has a membership label of member or nonmember). The training of the attack classifier 120 uses the labeled training data of equation 12 from the autonomous users 230, with both member and non-member data points as the training data. Inference is then run on the test points on which attempt is made to gain membership information.

Given a target user (such as the target user 101) and his or her interactions with the platform, the recommendation system 108 provides a plurality of recommendations to the target user 101. Based on such recommendations and the interactions, the feature vector for the target user is generated, e.g., as described above with respect to equations 1-13. The feature vector is then used as an input for the attack classifier 120, which carries out the inference, to determine a user's membership label.

For example, the attack classifier 120 is configured to determine whether a target user (such as an autonomous user 230*a*) is a member or a non-member. As described above, non-members are users whom the recommender system has not been trained on. For example, assume a user (such as a user 201) signs up for the platform 105 and immediately makes X_out interactions with the platform 105. The platform 105 generates Y_out recommendations using various cold start strategies (e.g., as the platform 105 does not have any insights on the user 201 yet). Assume that the Y_out recommendations made to this user are recorded. Using the X_out interactions and the Y_out recommendations, the corresponding feature vectors may be calculated using equation 11, and equation 13 may be used to label the user 201 as a non-member. Then the attack classifier 120 waits until the interaction and recommendation data X_out and Y_out, respectively, of the user is incorporated into the recommendation system 108. This may take some time, such as up to a day or up to a week, for example. For example, the recommendation system 108 may be retrained (e.g., in case the recommendation system 108 is using user data for training) using the X_out interactions and the Y_out recommendations of the user 201.

At this point, interaction and recommendation data X_in and Y_in of a member autonomous user are recorded. Since these interaction and recommendation data are part of the trained or retrained recommendation system, the recommendations are generated by the recommendation system 112 rather than cold start strategies. The training data generation service 236 computes the feature vector again using equation 12 and labels the user as a member.

The data from these processes are used to train the attack classifier 120 that classifies whether a target user is a member or a non-member. The classification is not deterministic because there is no fixed number of interactions or recommendations used to compute the feature vector; it could be based on any number of interactions. During inference of the attack classifier, the target user's interactions and recommendations are used to compute a feature vector. This vector is then fed into the attack classifier 120 to classify whether the target user is a member or nonmember.

Figure 4:
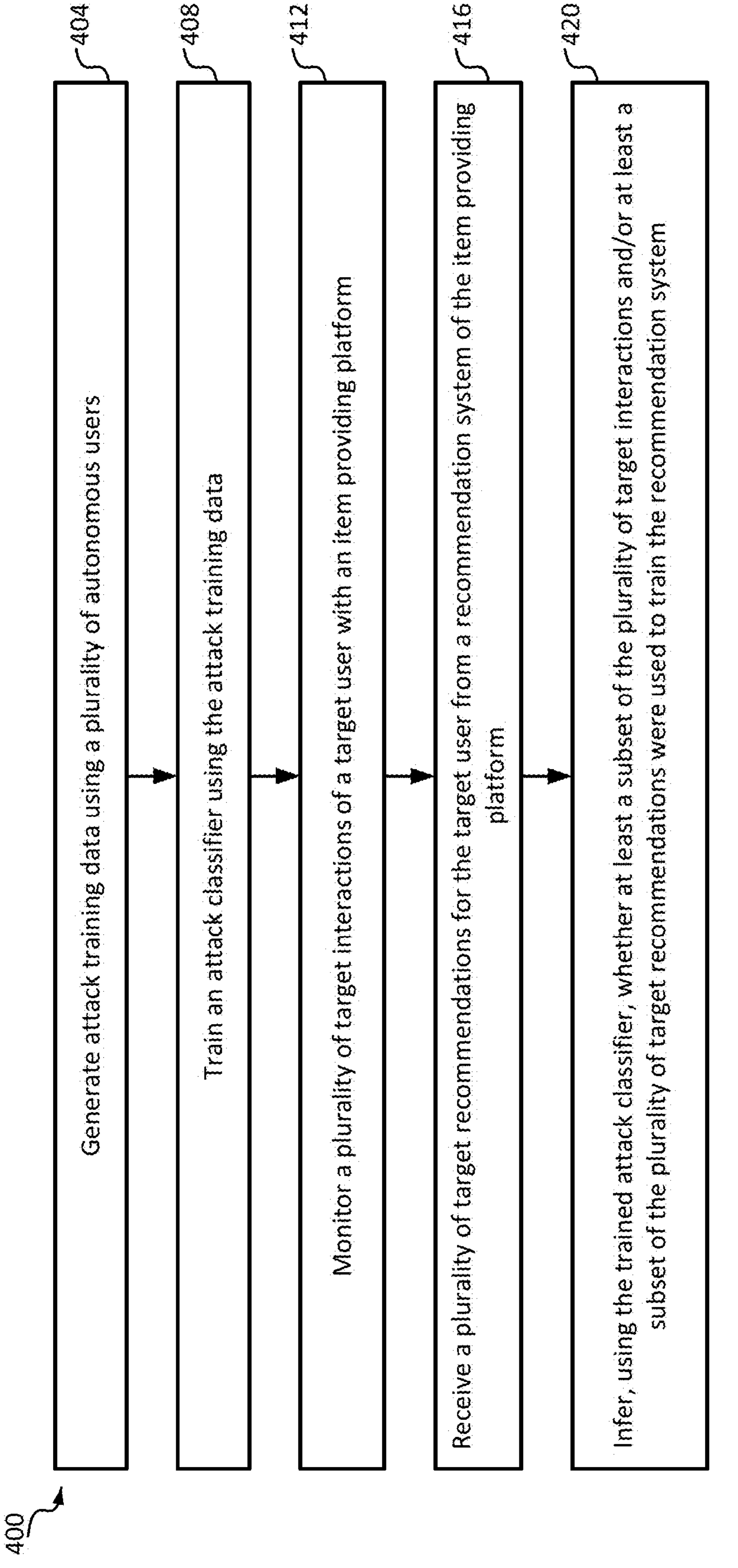
FIG. 4 illustrates a method depicting a membership inference attack carried out by a trained attack classifier.

FIG. 4 illustrates a method 400 depicting a membership inference attack carried out by a trained attack classifier. The membership inference attack may be carried out by the trained attack classifier 124 of FIGS. 1-3.

At 404, attack training data is generated (e.g., by the training data generation service 236) using a plurality of autonomous users, such as the autonomous users 230*a*, . . . , 230M. Generation of the attack training data (such as the labelled member difference vector and nonmember difference vector of equation 13) has been described above with respect to equations 1-13.

The method proceeds from 404 to 408. At 408, an attack classifier is trained using the attack training data.

The method proceeds from 408 to 412. At 412, a plurality of target interactions of a target user (such as the target user 101 described above) with an item providing platform (such as the platform 105) is monitored. Various possible examples of such interactions have also been described above.

The method proceeds from 412 to 416. At 416, a plurality of target recommendations for the target user is received from a recommendation system of the item providing platform. For example, FIG. 1 illustrates target recommendations 112 generated by the recommendation system 108, which is received by the attack classifier 120.

The method proceeds from 416 to 420. At 420, using the trained attack classifier, an inference is made as to whether at least a subset of the plurality of target interactions and/or at least a subset of the plurality of target recommendations were used to train the recommendation system. In an example, such usage of the data of the target user in training the recommendation system, without permission from the target user, may be undesirable from the perspective of the target user and/or his or her data privacy perspective.

Computer System Architecture

Figure 5:
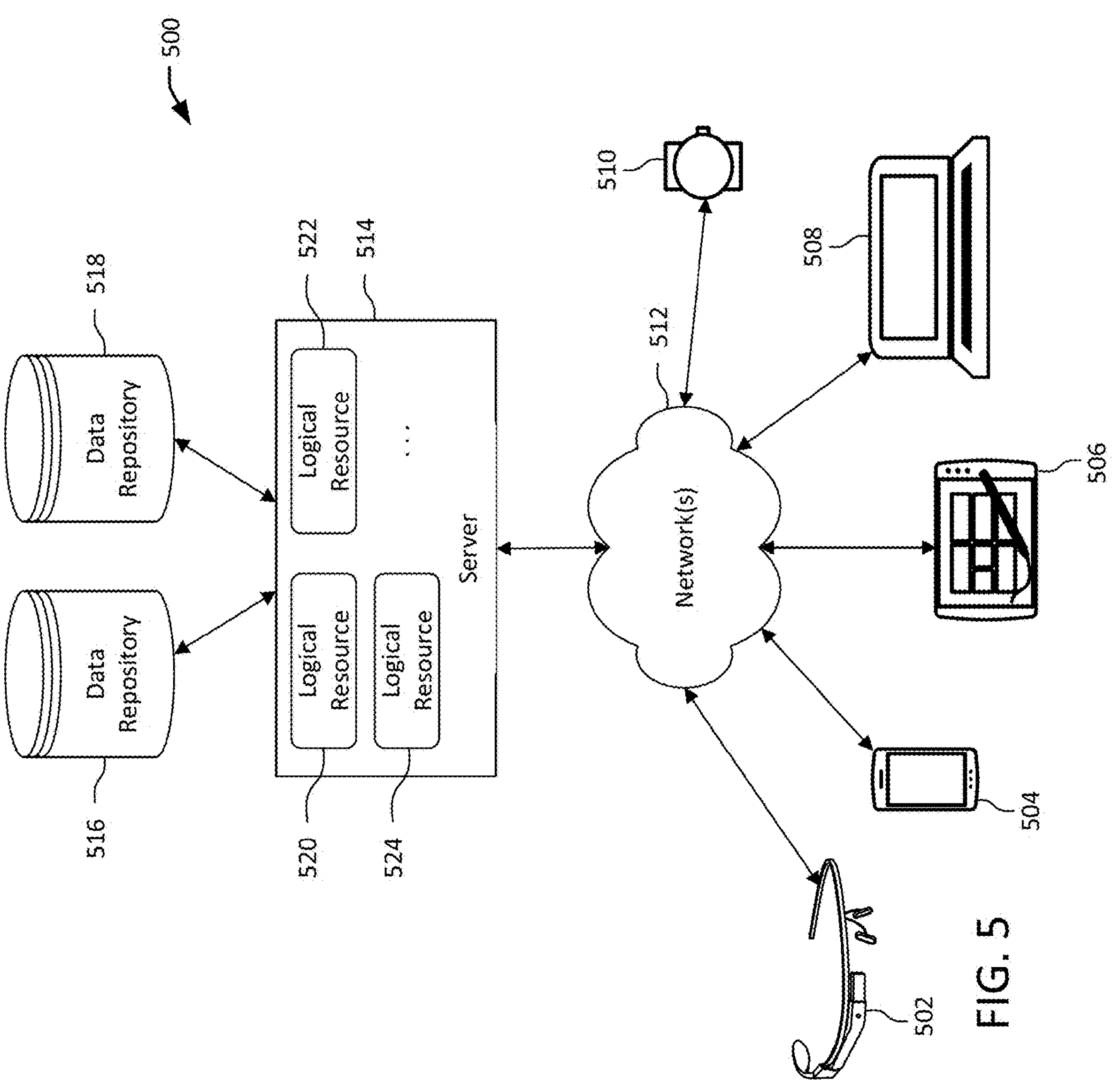
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for training an attack classifier machine learning model, and using the trained attack classifier machine learning model for conducting membership inference attacks.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for training an attack classifier machine learning model, and using the trained attack classifier machine learning model for conducting membership inference attacks in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth™, and/or any other wireless protocol), and/or any combination of these and/or other networks.

Server 514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for training an attack classifier machine learning model, and using the trained attack classifier machine learning model for conducting membership inference attacks. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
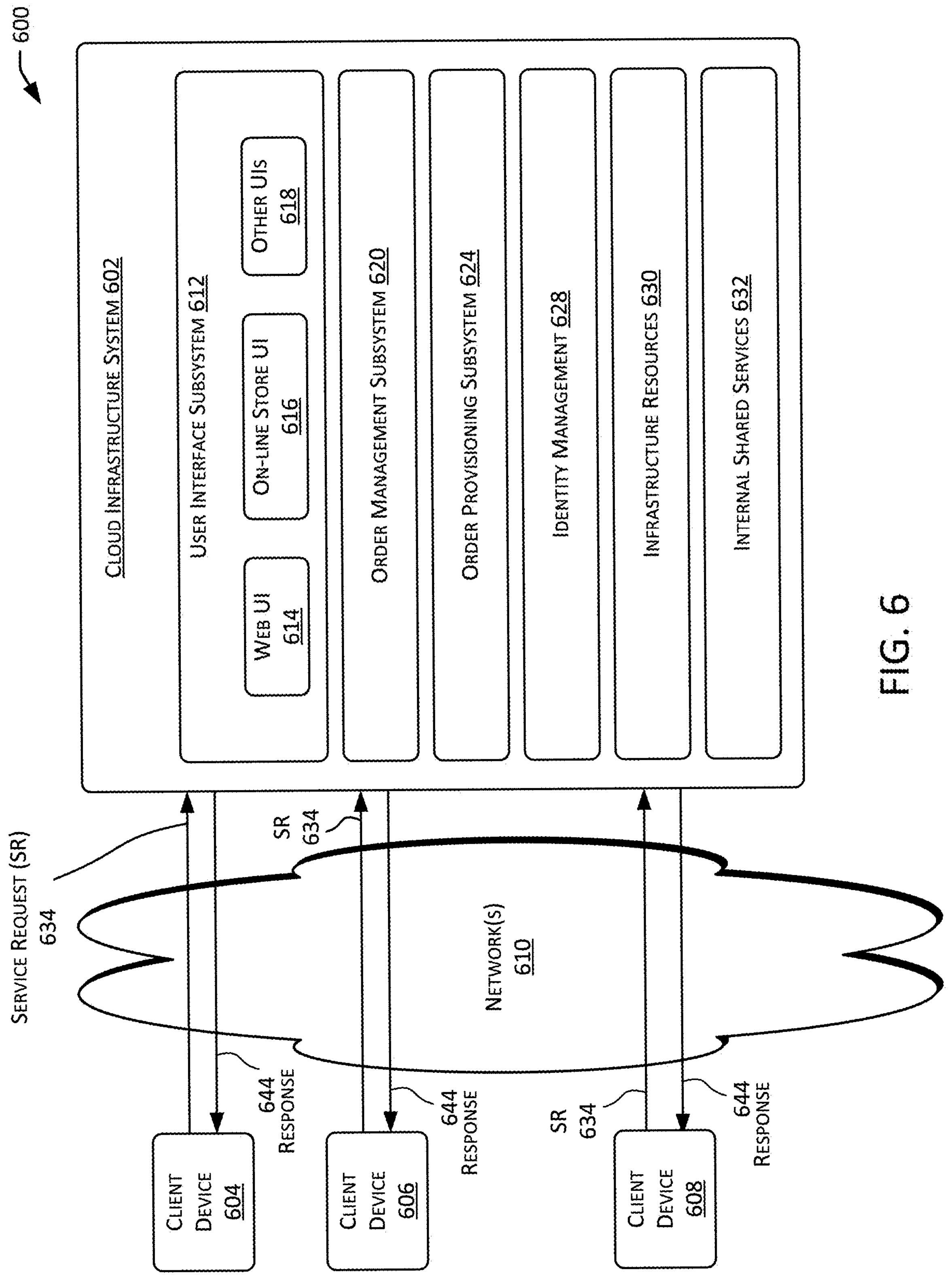
FIG. 6 is a simplified block diagram of one or more components of a system environment by which services provided by one or more components of an embodiment system may be offered as cloud services, in accordance with certain aspects.

FIG. 6 is a simplified block diagram of a cloud-based system environment in which an attack classifier machine learning model is trained, and the trained attack classifier machine learning model is used for conducting membership inference attacks, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610

(e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to provide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to.

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
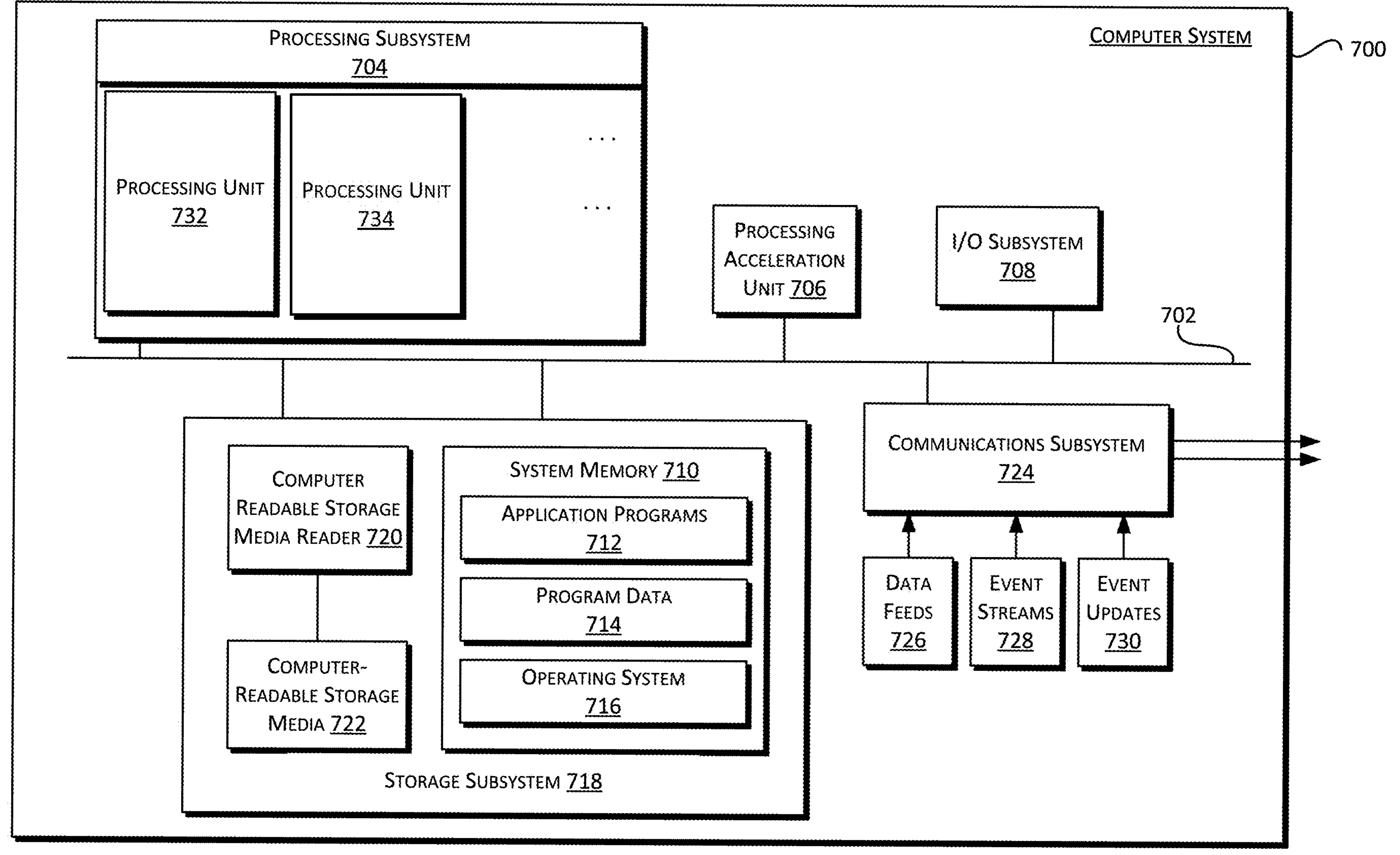
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Meta Quest head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause a system including the one or more processors to perform operations including:

monitoring a plurality of target interactions of a target user with an item providing platform;

receiving a plurality of target recommendations for the target user from a recommendation system of the item providing platform;

inferring, using an attack classifier and based at least in part on (i) the plurality of target interactions and (ii) the plurality of target recommendations, whether at least a subset of the plurality of target interactions and/or at least a subset of the plurality of target recommendations were used to train the recommendation system;

interacting, by each of a plurality of autonomous users, with the item providing platform;

receiving, by each of the plurality of autonomous users, a corresponding plurality of recommendations from the item providing platform, based at least in part on interaction of the corresponding autonomous user with the item providing platform;

generating, for a first autonomous user of the plurality of autonomous users, (i) a center interaction vector, based at least in part on one or more items with which the first autonomous user interacted with the item providing platform, (ii) a center recommendation vector, based at least in part on one or more recommendations received by the first autonomous user from the item providing platform, and (iii) a difference vector, based at least in part on the center interaction vector and the center recommendation vector;

generating training data, based at least in part on the difference vector; and training the attack classifier using the training data.

2. The non-transitory computer-readable medium of claim 1, wherein the operations further include:

classifying each of the plurality of autonomous users as either a member or a nonmember, wherein an autonomous user of the plurality of autonomous users is classified as a nonmember in response to the autonomous user having less than a threshold number of interactions or less than a threshold time period of interactions with the item providing platform, and wherein another autonomous user of the plurality of autonomous users is classified as a member in response to the other autonomous user having at least the threshold number of interactions or at least the threshold time period of interactions with the item providing platform.

3. The non-transitory computer-readable medium of claim 2, wherein the first autonomous user of the plurality of autonomous users is classified as a nonmember, wherein the center interaction vector is a center nonmember interaction vector, the center recommendation vector is a center nonmember recommendation vector, and the difference vector is a nonmember difference vector, and wherein the operations further include:

generating, for the first autonomous user, (i) a list of nonmember items including the one or more items with which the first autonomous user interacted, (ii) a plurality of nonmember interaction vectors, wherein each nonmember interaction vector of the plurality of nonmember interaction vectors includes attributes associated with a corresponding item included within the list of nonmember items, (iii) a list of nonmember recommendations including the one or more recommendations received by the first autonomous user from the item providing platform, (iv) a plurality of nonmember recommendation vectors, wherein each nonmember recommendation vector of the plurality of nonmember recommendation vectors includes attributes associated with a corresponding recommendation included within the list of nonmember recommendations, wherein the center nonmember interaction vector is generated based at least in part on the plurality of nonmember interaction vectors, wherein the center nonmember recommendation vector is generated based at least in part on the plurality of nonmember recommendation vectors, and wherein the nonmember difference vector is generated based at least in part on a difference between the center nonmember interaction vector and the center nonmember recommendation vector.

4. The non-transitory computer-readable medium of claim 3, wherein a second autonomous user of the plurality of autonomous users is classified as a member, and wherein the operations further include:

generating, for the second autonomous user, (i) a list of member items including one or more items with which the second autonomous user interacted, (ii) a plurality of member interaction vectors, wherein each member interaction vector of the plurality of member interaction vectors includes attributes associated with a corresponding item included within the list of member items, (iii) a list of member recommendations including one or more recommendations received by the second autonomous user from the item providing platform, (iv) a plurality of member recommendation vectors, wherein each member recommendation vector of the plurality of member recommendation vectors includes attributes associated with a corresponding recommendation included within the list of member recommendations, (v) a center member interaction vector generated based at least in part on the plurality of member interaction vectors, (vi) a center member recommendation vector generated based at least in part on the plurality of member recommendation vectors, and (vii) a member difference vector generated based at least in part on a difference between the center member interaction vector and the center member recommendation vector.

5. The non-transitory computer-readable medium of claim 4, wherein the training data comprises (i) the nonmember difference vector, along with a label of nonmember associated with the nonmember difference vector, and (ii) the member difference vector, along with a label of member associated with the member difference vector.

6. The non-transitory computer-readable medium of claim 1, wherein the attack classifier comprises a binary classifier.

7. The non-transitory computer-readable medium of claim 1, wherein the operations further include:

accessing (i) a plurality of interactions between a plurality of users and the item providing platform, and (ii) a plurality of recommendations received by the plurality of users from the item providing platform;

clustering the plurality of interactions and the plurality of recommendation into a plurality of clusters;

training each of a plurality of classifiers using data from a corresponding cluster of the plurality of clusters; and operating each autonomous user of the plurality of autonomous users in conjunction with a corresponding classifier of the plurality of classifiers.

8. The non-transitory computer-readable medium of claim 7, wherein operating each autonomous user comprises:

operating the first autonomous user of the plurality of autonomous users in conjunction with a first classifier of the plurality of classifiers, such that when the first autonomous user is to interact with an item, the first classifier dictates an action to be undertaken by the first autonomous user while interacting with the item.

9. The non-transitory computer-readable medium of claim 1, wherein each of the plurality of autonomous users comprises a plurality of sock puppets.

10. The non-transitory computer-readable medium of claim 1, wherein the item providing platform is one of a video providing platform, an audio providing platform, or a shopping platform.

11. A computer implemented method comprising:

monitoring a plurality of target interactions of a target user with an item providing platform;

receiving a plurality of target recommendations for the target user from a recommendation system of the item providing platform; and inferring, using an attack classifier and based on (i) the plurality of target interactions and (ii) the plurality of target recommendations, whether at least a subset of the plurality of target interactions and/or at least a subset of the plurality of target recommendations were used to train the recommendation system;

interacting, by each of a plurality of autonomous users, with the item providing platform;

receiving, by each of the plurality of autonomous users, a corresponding plurality of recommendations from the item providing platform, based on interaction of the corresponding autonomous user with the item providing platform;

generating, for a first autonomous user of the plurality of autonomous users, (i) a center interaction vector, based at least in part on one or more items with which the first autonomous user interacted with the item providing platform, (ii) a center recommendation vector, based at least in part on one or more recommendations received by the first autonomous user from the item providing platform, and (iii) a difference vector, based at least in part on the center interaction vector and the center recommendation vector;

generating training data, based at least in part on the difference vector; and training the attack classifier using the training data.

12. The method of claim 11, wherein the attack classifier comprises a binary classifier.

13. The method of claim 11, further comprising:

accessing (i) a plurality of interactions between a plurality of users and the item providing platform, and (ii) a plurality of recommendations received by the plurality of users from the item providing platform;

clustering the plurality of interactions and the plurality of recommendation into a plurality of clusters;

training each of a plurality of classifiers using data from a corresponding cluster of the plurality of clusters; and operating each autonomous user of the plurality of autonomous users in conjunction with a corresponding classifier of the plurality of classifiers.

14. The method of claim 13, wherein operating each autonomous user comprises:

operating the first autonomous user of the plurality of autonomous users in conjunction with a first classifier of the plurality of classifiers, such that when the first autonomous user is to interact with an item, the first classifier dictates an action to be undertaken by the first autonomous user while interacting with the item.

15. The method of claim 11, wherein the item providing platform is one of a video providing platform, an audio providing platform, or a shopping platform.

16. A system comprising:

one or more processors; and one or more non-transitory computer-readable media storing instructions, which, when executed by the system, cause the system to perform a set of actions including:

monitoring a plurality of target interactions of a target user with an item providing platform;

receiving a plurality of target recommendations for the target user from a recommendation system of the item providing platform; and inferring, using an attack classifier and based on (i) the plurality of target interactions and (ii) the plurality of target recommendations, whether at least a subset of the plurality of target interactions and/or at least a subset of the plurality of target recommendations were used to train the recommendation system;

interacting, by each of a plurality of autonomous users, with the item providing platform;

receiving, by each of the plurality of autonomous users, a corresponding plurality of recommendations from the item providing platform, based on interaction of the corresponding autonomous user with the item providing platform;

generating, for a first autonomous user of the plurality of autonomous users, (i) a center interaction vector, based at least in part on one or more items with which the first autonomous user interacted with the item providing platform, (ii) a center recommendation vector, based at least in part on one or more recommendations received by the first autonomous user from the item providing platform, and (iii) a difference vector, based at least in part on the center interaction vector and the center recommendation vector;

generating training data, based at least in part on the difference vector; and training the attack classifier using the training data.

17. The system of claim 16, wherein the item providing platform is one of a video providing platform, an audio providing platform, or a shopping platform.

18. The system of claim 16, wherein each of the plurality of autonomous users comprises a plurality of sock puppets.

19. The system of claim 16, wherein the attack classifier comprises a binary classifier.

20. The system of claim 19, wherein the set of actions further include:

classifying each of the plurality of autonomous users as either a member or a nonmember, wherein an autonomous user of the plurality of autonomous users is classified as a nonmember in response to the autonomous user having less than a threshold number of interactions or less than a threshold time period of interactions with the item providing platform, and wherein another autonomous user of the plurality of autonomous users is classified as a member in response to the other autonomous user having at least the threshold number of interactions or at least the threshold time period of interactions with the item providing platform.

* * * * *